(12) United States Patent
Finkelshtain et al.

(10) Patent No.: US 10,530,001 B2
(45) Date of Patent: Jan. 7, 2020

(54) SCRUBBING DEVICE FOR GAS USED IN A FUEL CELL AND METHOD OF SCRUBBING GAS USING THE DEVICE

(71) Applicant: GENCELL LTD., Petah Tikva (IL)

(72) Inventors: Gennadi Finkelshtain, Modiin (IL); Michael Lerner, Rishon LeZion (IL); Nino Borchtchoukova, Modiin (IL); Tomi Erkki Anttila, Helsinki (FI)

(73) Assignee: Gencell Ltd., Patah Tikva (IL)

( * ) Notice: Subject to any disclaimer, the term of this patent is extended or adjusted under 35 U.S.C. 154(b) by 302 days.

(21) Appl. No.: 15/311,310

(22) PCT Filed: May 18, 2015

(86) PCT No.: PCT/US2015/031339
§ 371 (c)(1),
(2) Date: Nov. 15, 2016

(87) PCT Pub. No.: WO2015/179275
PCT Pub. Date: Nov. 26, 2015

(65) Prior Publication Data
US 2017/0084944 A1    Mar. 23, 2017

Related U.S. Application Data

(60) Provisional application No. 62/000,105, filed on May 19, 2014.

(51) Int. Cl.
*H01M 8/00* (2016.01)
*H01M 8/0668* (2016.01)
(Continued)

(52) U.S. Cl.
CPC ........... *H01M 8/0668* (2013.01); *B01J 20/06* (2013.01); *B01J 20/22* (2013.01);
(Continued)

(58) Field of Classification Search
CPC ............... H01M 8/0668; H01M 8/083; H01M 8/04089; B01J 20/06; B01J 20/22; B01J 20/28052; B01J 20/28085; B01J 20/3458
See application file for complete search history.

(56) References Cited

U.S. PATENT DOCUMENTS 5,595,949 A    1/1997  Goldstein et al.
7,326,280 B2   2/2008  Hrycak et al.
(Continued)

FOREIGN PATENT DOCUMENTS

GB    2305139 A        4/1997
WO    2005053831 A2    6/2005
WO    2006063471 A2    6/2006

*Primary Examiner* — Cynthia H Kelly
*Assistant Examiner* — Monique M Wills
(74) *Attorney, Agent, or Firm* — Abel Schillinger, LLP

(57) ABSTRACT

Disclosed is a device for scrubbing carbon dioxide-contaminated gas for use in a fuel cell. The device comprises at least one first opening for allowing gas to enter or exit the device, at least one second opening for allowing gas to exit or enter the device, and at least one sorbent that is capable of removing carbon dioxide from the gas and is arranged in a form of layers which the gas contacts when it flows from the first to the second opening. The device may further comprise one or two gas preparation units for removing solid and/or liquid contaminants from the gas and for adjusting the temperature and/or humidity of the gas.

20 Claims, 6 Drawing Sheets

(51) Int. Cl.
    *H01M 8/04089* (2016.01)
    *B01J 20/06* (2006.01)
    *B01J 20/22* (2006.01)
    *B01J 20/28* (2006.01)
    *B01J 20/34* (2006.01)
    *H01M 8/083* (2016.01)

(52) U.S. Cl.
    CPC ... *B01J 20/28052* (2013.01); *B01J 20/28085* (2013.01); *B01J 20/3458* (2013.01); *H01M 8/04089* (2013.01); *H01M 8/083* (2013.01)

(56) References Cited

U.S. PATENT DOCUMENTS

| | | | |
|---|---|---|---|
| 7,361,199 B2 | 4/2008 | Gittleman et al. | |
| 8,088,197 B2 | 1/2012 | Wright et al. | |
| 8,409,331 B2 | 4/2013 | Karichev et al. | |
| 2005/0232858 A1 | 10/2005 | Hampden-Smith et al. | |
| 2006/0039853 A1* | 2/2006 | Fan | B01D 53/62 423/637 |
| 2006/0123989 A1 | 6/2006 | Karichev et al. | |
| 2007/0003800 A1 | 1/2007 | Dallas et al. | |
| 2007/0141430 A1* | 6/2007 | Huang | B01D 53/02 429/403 |
| 2008/0145737 A1 | 6/2008 | Cai et al. | |
| 2009/0018668 A1* | 1/2009 | Galbraith | B01J 20/3441 623/23.65 |
| 2009/0325012 A1 | 12/2009 | Nor | |
| 2010/0239924 A1* | 9/2010 | McElroy | H01M 8/04007 429/423 |
| 2010/0329963 A1* | 12/2010 | Sceats | B01D 53/62 423/437.1 |
| 2011/0111314 A1* | 5/2011 | Cui | C01B 3/38 429/417 |
| 2011/0223507 A1* | 9/2011 | LaVen | H01M 8/04029 429/437 |
| 2012/0034536 A1* | 2/2012 | Isom | B01D 53/1412 429/410 |
| 2016/0045841 A1* | 2/2016 | Kaplan | B01J 19/0093 429/49 |
| 2017/0173557 A1* | 6/2017 | Olson | C01B 32/342 |

* cited by examiner

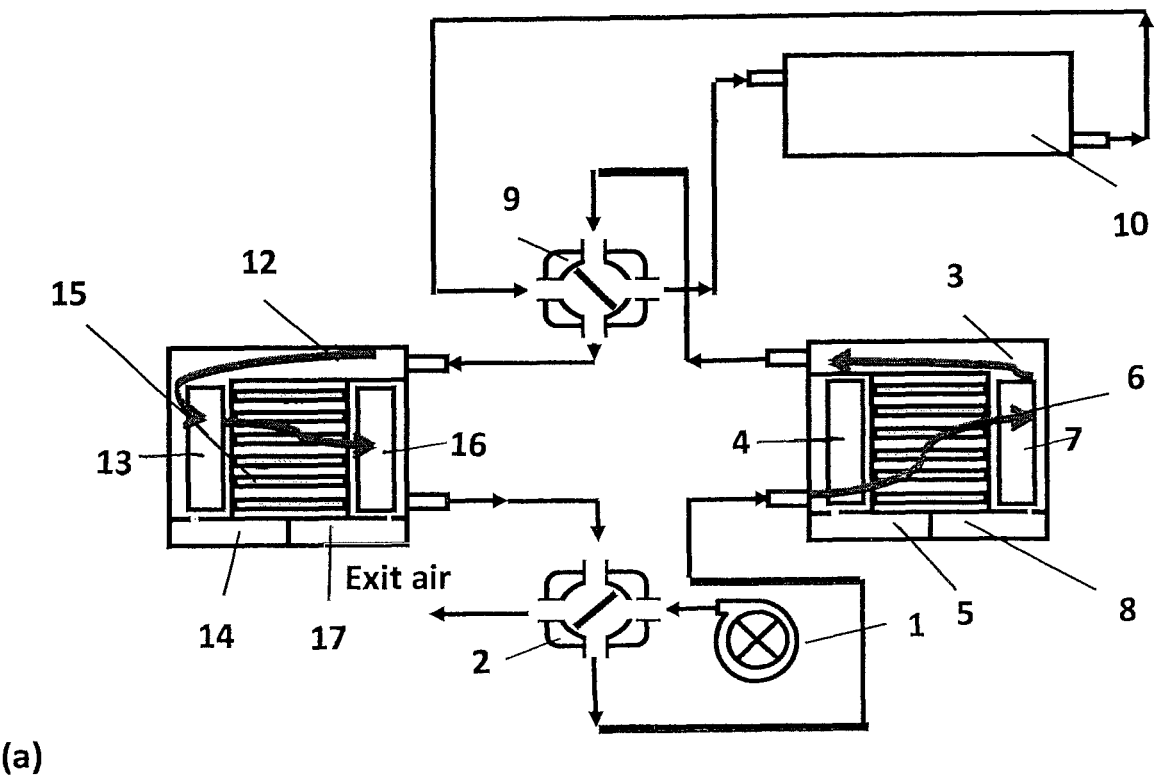
(a)
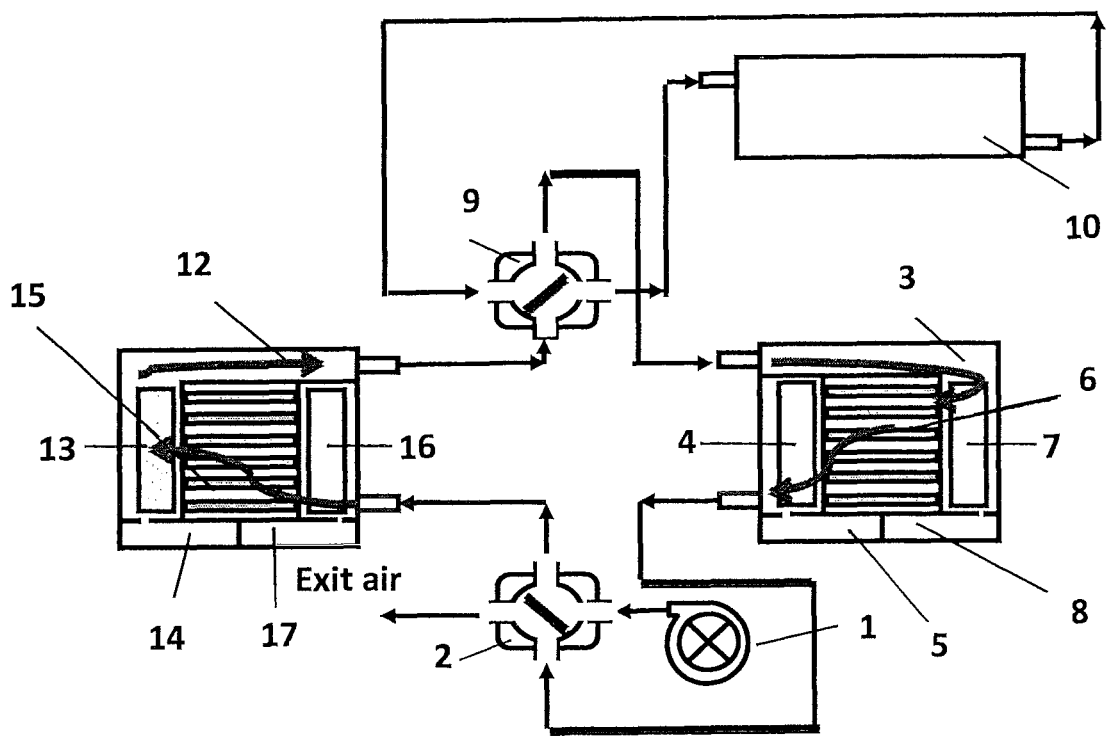
(b)
Fig. 1

SCRUBBING DEVICE FOR GAS USED IN A FUEL CELL AND METHOD OF SCRUBBING GAS USING THE DEVICE

CROSS-REFERENCE TO RELATED APPLICATIONS

The present application claims priority of U.S. Provisional Patent Application No. 62/000,105, filed May 19, 2014, the entire disclosure of which is expressly incorporated by reference herein.

BACKGROUND OF THE INVENTION

1. Field of the Invention

The present invention relates to a universal regenerative method of continuous gas scrubbing for a fuel cell and a device for its implementation. In particular, the present invention relates to a device for removing carbon dioxide from gas (e.g., air) that is to be used as, e.g., oxidant in a fuel cell and in particular, an alkaline fuel cell and to a method of scrubbing gas for use in a fuel cell with the device.

2. Discussion of Background Information

A fuel cell (FC) is one of the oldest electrochemical devices that generate electricity, heat and water by direct electrochemical reaction of a hydrogen-rich fuel with oxygen without any harmful emissions and therefore in an extremely environmentally friendly way. The direct generation of electricity allows FCs to be highly energy efficient. FCs have been deployed as an alternative power generation technique for the future in both mobile and stationary applications, ranging from toys to scale power stations and plants, from vehicles to mobile chargers, and from household power to battlefield power. FCs are generally classified according to the nature of the electrolyte: alkaline fuel cells (AFC), proton-exchange membrane fuel cells (PEMFCs), solid oxide fuel cells (SOFCs), phosphoric acid fuel cells (PACFs) and molten carbonate fuel cells (MCFCs), each with its own characteristic, each type requiring particular materials and fuel. However, they all comprise the same essential components, namely anode support, anode catalyst layer, electrolyte, cathode support, cathode catalyst layer, bipolar plates/interconnects and sometimes gaskets for sealing/preventing leakage of gases between anode and cathode. Each fuel cell type also has its own operational characteristics, offering advantages to particular applications. This makes fuel cells a very versatile technology.

AFCs show promise as environmentally friendly electrochemical power sources for distributed cogeneration for building, and transportation applications. The traditional AFCs operate on compressed hydrogen and oxygen and generally use a solution of potassium hydroxide in water as their electrolyte. AFCs use a liquid KOH electrolyte solution because it is the most conductive of all alkaline hydroxides, and also an effective heat transfer and water management medium. In these cells, hydroxyl ions ($OH^-$) migrate from the cathode to the anode. The hydrogen fuel is supplied continuously to the anode compartment and an oxidant (often oxygen from air) is fed continuously to the cathode compartment. At the anode, hydrogen gas reacts with the $OH^-$ ions to produce water and release electrons. Electrons generated at the anode supply electrical power to an external circuit, then return to the cathode. There the electrons react with oxygen and water to produce more $OH^-$ ions that diffuse into the electrolyte. AFCs operate at efficiencies up to 70 percent and create little pollution. Because they produce potable water in addition to electricity, they have been a logical choice for spacecraft.

Atmospheric ambient air is often used as the oxidant in an AFC. There are several hundred ppm of carbon dioxide in ambient air. By reacting with the alkaline electrolyte (usually KOH) the carbon dioxide forms carbonates which precipitate and thereby adversely affect the performance of the AFC. Accordingly, in order to increase the lifetime and maintain the performance of an AFC, scrubbing of the air (or any other gas that may be used in the fuel cell) to remove carbon dioxide therefrom is necessary.

A method and a device for carbon dioxide ($CO_2$) removal from air for use in an AFC are known from US 2006/0123989 A1, the entire disclosure of which is incorporated by reference herein. The device comprises a booster for a stream of air (an air supercharger), connected by means of pipes and a shutoff valve with adsorbers (scrubbers) equipped with hydrated oxides of zirconium as $CO_2$ sorbent and connected to the air inlet of a fuel cell. The shutoff valve is made in the form of switches that provide serial connection of a gas inlet and a gas outlet of one of the adsorbers to the booster for air supply and to the air inlet of a fuel cell respectively, and the gas outlet of the other adsorber through a heater to the exhaust of a fuel cell.

However, the known device exhibits a number of shortcomings. For example, the type of sorbent used in the device (hydrated oxides of transition metals) requires air having a specified temperature (60-120° C.) and a limited humidity (not more than 85%). Further, the known device does not provide protection of the sorbent against a possible pollution by a stream (flow) of hot gas for the regeneration of sorbent that arrives from a fuel cell in a scrubber. This gas may contain small particles separated from the electrodes, drops, and aerosol substances, which adversely affect a sorbent material, reducing its active life. Additionally, the design of the scrubber (adsorber) does not allow the use of sorbent in the form of small-diameter granules since the use of granules having a diameter of less than 1.5 mm and especially cylindrical granules results in a sharp increase in the gas pressure at the gas inlet of a scrubber, resulting in an increased power consumption of the device and a need of redesigning the entire FC system. Also, the device uses external air heaters (i.e., heaters located outside the device). This results in a heat loss by the air on its way to a scrubber, the need for additional space in an FC system for accommodation the external heaters and to harmful thermal effects on other components of an FC system. Finally, the air stream switches of the 4/2 type exclusively used in the device have no compact standard analogs, and special development is required that makes the entire device more expensive and reduces its reliability.

In view of the foregoing, there is a need for an improved device for removing carbon dioxide in the gas (air) for use in a fuel cell and in particular, an alkaline fuel cell.

SUMMARY OF THE INVENTION

The present invention provides a (first) device for scrubbing carbon dioxide-contaminated gas for use in a fuel cell. The device comprises at least one first opening (a) for allowing gas to enter or exit the device, at least one second opening (b) for allowing gas to exit or enter the device, one of (a) and (b) being connected to a gas inlet or a gas outlet of a fuel cell, and at least one sorbent (c) that is capable of removing carbon dioxide from the gas and is arranged in the form of (two or more) layers which the gas contacts when flowing from (a) to (b), or vice versa.

In one aspect of the device, the fuel cell may be an alkaline fuel cell.

The present invention further provides a (second) device for scrubbing carbon dioxide-contaminated gas for use in a fuel cell. The device comprises at least one first opening (a) for allowing gas to enter or exit the device, at least one second opening (b) for allowing gas to exit or enter the device, at least one sorbent (c) that is capable of removing carbon dioxide from the gas and is arranged in the form of (two or more) layers which the gas contacts when flowing from (a) to (b), or vice versa. The device further comprises a first gas preparation unit (d) and/or a second gas preparation unit (e) (preferably both). Gas whose carbon dioxide content is to be reduced passes through the first gas preparation unit (d) before contacting sorbent (c). Unit (d) comprises one or more of an element (i) for removing solid and/or liquid contaminants from the gas, an element (ii) for heating or cooling the gas, and an element (iii) for humidifying or dehumidifying the gas. Gas for regenerating sorbent (c) passes through the second gas preparation unit (e) before contacting carbon dioxide-loaded sorbent. Unit (e) comprises one or more of an element (i) for removing solid and/or liquid contaminants from the regenerating gas, an element (ii) for heating or cooling the regenerating gas, and an element (iii) for humidifying or dehumidifying the regenerating gas.

In one aspect of the above first and second devices, the device may comprises at least three layers of sorbent (c) and/or the layers of (c) may be arranged substantially in parallel to each other and/or the average distance between the layers of (c) may be from 1 mm to 10 mm and/or the layers of (c) may be arranged substantially in parallel to a direction of flow of gas from opening (a) to opening (b) or vice versa and/or the layers may have an average thickness of from 1 mm to 10 mm.

In another aspect, sorbent (c) may be regeneratable. For example, (c) may comprise at least one amine (which amine may, for example, be immobilized on silica particles and/or impregnated on natural fibers and/or impregnated on a basic ion exchange resin) and/or may comprise at least one hydrated oxide of a transition metal (e.g., zirconium) and/or may comprise a hydrotalcite.

In yet another aspect, sorbent (c) may comprise particles having an average largest dimension of not more than 0.5 mm and/or may comprise a porous material having an average pore size of not more than 0.5 mm.

In another aspect of the (second) device of the present invention, at least one of the gas preparation units (d) and (e) may be arranged substantially perpendicular to the direction of flow of gas from opening (a) to opening (b), and in the opposite direction, i.e. from opening (b) to opening (a).

In yet another aspect of the (second) device of the present invention, the device may further comprise a first receptacle (f) for receiving solid and/or liquid contaminants in the gas to be scrubbed which are removed by gas preparation unit (d) and/or a second receptacle (g) for receiving solid and/or liquid contaminants in regenerating gas which are removed by gas preparation unit (e).

In a still further aspect of the second device, element (i) of gas preparation unit (d) and/or element (i) of gas preparation unit (e) may comprise a hydrophobic porous material that is capable of removing solid and/or liquid contaminants from gas passing through it. For example, the hydrophobic porous material may be present in the form of sheets or layers.

In another aspect of the (second) device, element (ii) of gas preparation unit (d) and/or element (ii) of gas preparation unit (e) may comprise an electric heater and/or a (e.g. tubular) heat exchanger (e.g., of the gas-gas or the gas-liquid type).

In another aspect, element (iii) of gas preparation unit (d) and/or element (iii) of gas preparation unit (e) may comprise a hydrophilic porous material which is capable of humidifying or dehumidifying gas passing through it. For example, the hydrophilic porous material may be present in the form of a fibrous sheet or layer.

In another aspect of the (second) device of the present invention, gas preparation units (d) and (e) may be present and both may comprise at least units (i) and (iii) or all units (i), (ii), and (iii). For example, units (i) and (iii) or units (i) to (iii) may be arranged such that gas will contact (e.g., pass through) element (i) first.

In another aspect of the (second) device, one of opening (a) and opening (b) may be connected to a gas inlet or a gas outlet of a fuel cell and in particular, an alkaline fuel cell.

The present invention further provides a fuel cell system which comprises a fuel cell (A) and in particular, an alkaline fuel cell, and at least one device (B) for scrubbing carbon dioxide-contaminated gas according to the present invention as set forth above (including the various aspects thereof).

In one aspect thereof, the system may further comprise a device (C) for supplying gas to be scrubbed to (B).

In another aspect, the system may comprise at least two devices (B), device (B1) and device (B2). For example, a device (B1) may be connected to a gas inlet of fuel cell (A) and a device (B2) may be connected to a gas outlet (exhaust) of (A). Further, this system may be configured such that gas coming from a gas outlet of (A) (of reduced oxygen content but substantially free of carbon dioxide) can be used as (1) regenerating gas for carbon dioxide-loaded sorbent (c) of (B2) while gas provided by (C) is scrubbed by (B1) or as (2) regenerating gas for carbon dioxide-loaded sorbent (c) of (B1) while gas provided by (C) is scrubbed by (B2). In another aspect of this system, at least one valve (D) may be arranged between the (A) and (B1) and (B2) and may be capable of connecting the gas inlet and the gas outlet of (A) with (b) of (B1) or (B2) and (a) of (B2) or (B1). In a further aspect, at least one valve (E) may be arranged between (C) and (B1) and (B2) such that gas provided by (C) can be directed to either (a) of (B1) or (a) of (B2).

The present invention further provides a method of scrubbing carbon dioxide-contaminated gas for use in a fuel cell. The method comprises passing the gas through a gas scrubbing device according to the present invention as set forth above (including the various aspects thereof).

In one aspect of the method, the gas to be scrubbed may comprise or consist of (ambient) air.

In another aspect, the method may further comprise regenerating carbon dioxide-loaded sorbent (c). For example, carbon dioxide-loaded sorbent (c) may be regenerated by using gas that has passed through the fuel cell. In one aspect of this method, at least two devices for scrubbing gas for use in the fuel cell according to the present invention as set forth above may be used, i.e., a first device comprising fresh or regenerated agent (c) for removing carbon dioxide from the gas to afford a first device comprising carbon dioxide-loaded sorbent (c), and a second device comprising carbon dioxide-loaded sorbent (c) from a previous scrubbing operation, the carbon dioxide-loaded sorbent (c) being regenerated by using (scrubbed) gas from the first device that has already passed through the fuel cell to afford a second device comprising regenerated sorbent (c). This method may further comprise using the second device comprising regenerated sorbent (c) for removing carbon dioxide from the gas for use in the fuel cell and regenerating carbon dioxide-loaded sorbent (c) in the first device with (scrubbed) gas from the second device that has already passed through the fuel cell to afford a first device comprising regenerated agent (c). In one aspect, at least two scrubbing-regeneration cycles may be carried out.

In yet another aspect of the method, gas that has been used for regenerating carbon dioxide-loaded sorbent (c) may be used for heating (or any other) purposes.

BRIEF DESCRIPTION OF THE DRAWINGS

The present invention is further described in the detailed description which follows, in reference to the accompanying drawings by way of non-limiting examples of exemplary embodiments of the present invention. In the drawings:

FIGS. 1(a) and 1(b) schematically show a first embodiment of a fuel cell system according to the present invention;

DETAILED DESCRIPTION OF THE PRESENT INVENTION

Figure 2:
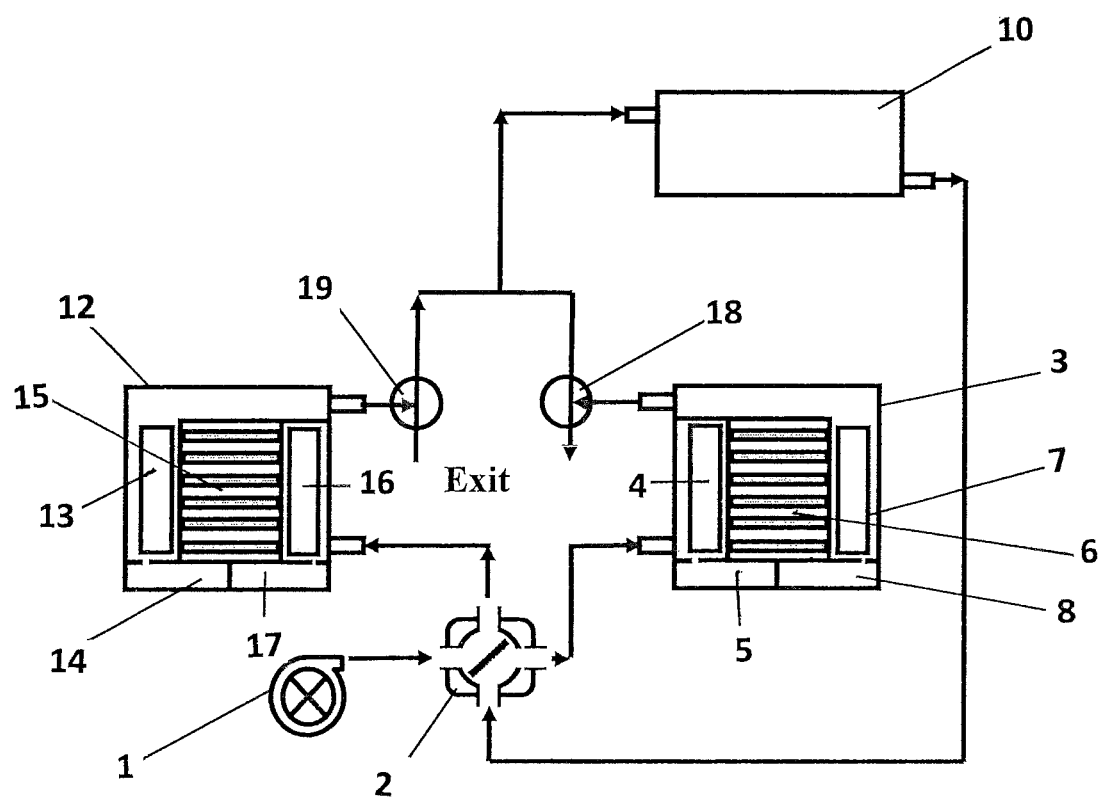
FIG. 2 schematically shows a second embodiment of a fuel cell system according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a," "an," and "the" include the plural reference unless the context clearly dictates otherwise. For example, reference to "a gas" would also mean that mixtures of two or more gases can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the present specification and the appended claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from 1 to 50, it is deemed to include, for example, 1, 7, 34, 46.1, 23.7, or any other value or range within the range.

A device of the present invention for scrubbing carbon dioxide-contaminated gas for use in an (e.g., alkaline) fuel cell comprises at least one (usually exactly one) first opening (a) for allowing gas to enter or exit the device, at least one (usually exactly one) second opening (b) for allowing gas to exit (leave) or enter the device, and at least one (usually solid or at least non-flowable) sorbent (c) (usually exactly one sorbent (c)) that is capable of removing carbon dioxide from the gas (e.g., air) and is arranged in the form of two or more layers which the gas will contact when flowing from opening (a) to opening (b) or vice versa. The sorbent (c) may be an adsorbent or an absorbent and may or may not be regeneratable, regeneratable sorbents being preferred. Non-limiting specific examples of sorbents include calcium hydroxide, calcium oxide, sodium hydroxide, potassium hydroxide (all non-regeneratable), solid hybrid sorbents such as amines immobilized on (e.g. silica) (nano) particles, amines impregnated on natural fibers or ion exchange resins (the amines may be low molecular weight compounds or polymers carrying primary and/or secondary and/or tertiary amino groups), zirconium hydroxide, and hydroxides of (layered) hydrotalcites. Regeneratable sorbents can usually be regenerated by heating them to at least slightly elevated temperatures to thereby break the weak bonds between carbon dioxide and the corresponding groups of the sorbent.

The sorbent (c) may be present in various (solid or at least non-flowable) forms. For example, (c) may be present in the form of granules or other particles (e.g. cylindrical particles) having an average largest dimension (e.g., diameter) of not more than 0.5 mm, e.g., not more than 0.4 mm, or not more than 0.35 mm. This is advantageous because in this way the surface area of the particles and thus, the area that comes into contact with the gas to be purified can be made relatively large. A suitable particle size is preferably determined according to the well-known Ergun equation, which establishes a relationship between the gas-dynamic (hydraulic) resistance layer of powdered material (sorbent) ΔP, the parameters of the gas flow and geometric parameters of the powder layer. The sorbent may also be present in the form of a porous material (e.g., in compact form or in the form of particles) having an average pore size of not more than 0.5 mm, e.g., not more than 0.4 mm, or not more than 0.35 mm. Again, this is advantageous in terms of surface area available for contacting the gas to be purified.

In the device according to the present invention, the sorbent is arranged in layers (e.g., as sorbent that is present on trays). Usually at least 3, e.g., at least 4, at least 5, at least 6, at least 7, at least 8, at least 9, or at least 10 layers are present. These layers or at least some of the layers may be arranged substantially in parallel to each other (e.g., with an angle formed by adjacent layers of not more than 20 degrees, e.g., not more than 10 degrees, or not more than 5 degrees). The layers are usually arranged substantially horizontally (e.g., with a slope of not more than 20 degrees, e.g., not more than 10 degrees, or not more than 5 degrees), although they can also be arranged in any other direction (e.g., substantially vertically). The layers of (c) may be arranged substantially parallel (e.g., with an angle of not more than 20 degrees, e.g., not more than 10 degrees, or not more than 5 degrees with respect to the direction of gas flow) to the flow of gas from opening (a) to opening (b), although any other orientation is suitable as well. The layers may further be arranged such that each layer is contacted by a different volume of gas to be purified or they may be arranged such that each volume of gas to be purified contacts each or at least several layers of (c) before it reaches opening (b). The average distance between adjacent layers may vary within a wide range, but will often be in the range of from 1 mm to 10 mm. The size of an individual layer may vary within a wide range as well, but will often be in the range from 10 $cm^2$ to 1000 $cm^2$, depending, inter alia, on the amount of gas to be scrubbed per time unit (and thus, the size of the fuel cell). The average thickness of the layers (which will usually have substantially the same thickness) may vary over a wide range but will usually be in the range of from 1 mm to 10 mm.

As set forth above, a device for scrubbing gas according to the present invention may also comprise a first gas preparation unit (d) for gas to be scrubbed (entering the device through opening (a)) and/or a second gas preparation unit (e) for gas to be used for regenerating carbon dioxide-loaded sorbent (c) (usually exhaust gas from the fuel cell and entering the device through the opening that corresponds to opening (b) through which gas that has been scrubbed in the device exits the device on its way to the fuel cell). Preferably, the device comprises two gas preparation units, (d) and (e), one arranged between the first opening through which gas to be scrubbed enters the device and the layers of sorbent (c) and one arranged between the (usually second) opening through which gas for regenerating the sorbent enters the device and the layers of (carbon dioxide-loaded) sorbent (c) (in other words, the direction of flow of the regenerating gas will usually, but not necessarily, be opposite to the direction of flow of the gas to be purified). Each of these units may comprise three (or even more) different components (elements), i.e., a first element (i) for removing solid and/or liquid contaminants from the gas (either the gas to be scrubbed or the regenerating gas), a second element (ii) for heating or cooling the gas, and a third element (iii) for humidifying or dehumidifying the gas. Each of the gas preparation units may be associated with a receptacle (e.g. a tank) for collecting the solid or liquid contaminants which have been removed from the gas by element (i). The gas preparation units (d) and (e) serve the purpose of, inter alia, adjusting the temperature and the humidity of the gas to suitable values, which values are dependent mainly on the type of sorbent (c) employed. For example, a suitable temperature of the gas for regenerating the sorbent will often be in the range of from 50 to 130° C. The relative humidity of gas to be scrubbed or for regeneration may vary within a wide range, e.g., from 4 to 100%.

Each of the gas preparation units (d) and (e) of the (second) device of the present invention will preferably be connected with a receptacle (f) in the form of e.g., a tank in which the solid and/or liquid contaminants in the gas to be scrubbed (removed by unit (d)) and the solid and/or liquid contaminants in the regenerating gas (removed by unit (e)) can be collected (which contaminants will later be discarded).

Element (i) of gas preparation unit (d) and/or element (i) of gas preparation unit (e), if present, will usually comprise a hydrophobic porous material, preferably present in the form of a sheet or layer. The hydrophobic material should be sufficiently porous to not create a significant flow barrier for the gas, but should have pores of a size that is small enough to prevent even very small solid particles or droplets of liquid from passing through it. Element (iii) of gas preparation unit (d) and/or element (iii) of gas preparation unit (e), if present, will usually comprise a hydrophilic porous material, preferably present in the form of a fibrous (e.g., cloth-like) sheet or layer. This material essentially functions as a wick and serves to adjust the humidity of the gas to be scrubbed or the humidity of the regenerating gas to the desired (preferably at least close to optimum) value (which value depends on, inter alia, the type of sorbent present in the device and on whether the gas is to be scrubbed or is a regenerating gas). Likewise, the heating or cooling element (ii), if present, can be used to adjust the temperature of the gas to be scrubbed or the temperature of the regenerating gas to the desired (optimum) value (which value again depends on, inter alia, the type of sorbent present in the device and on whether the gas is to be scrubbed or is a regenerating gas). The heating/cooling element may be present in various forms such as, e.g., an electric heater or an (e.g. tubular) heat exchanger (e.g., a gas-liquid or gas-gas heat exchanger).

The gas preparation units (d) and (e) may each comprise one, two or all of elements (i) to (iii), preferably all of them. Further, if element (i) is present it is preferable for element (i) to be the first element that is contacted by the gas to be scrubbed or the regenerating gas.

The gas preparation units (d) and (e) (or more precisely, the units thereof and in particular, units (i) and (iii)) may be arranged substantially perpendicularly to the direction of flow of gas from opening (a) to opening (b) or vice versa, although any other direction that is not parallel to direction of the flow of gas is suitable as well.

When in operation, one of the openings (a) and (b) of the device according to the present invention will be connected to the gas inlet or gas outlet of a fuel cell. For example, if gas to be scrubbed enters the device through opening (a), opening (b) will be connected to the gas inlet of the fuel cell. If the sorbent in the device is to be regenerated by exhaust (waste) gas from the fuel cell, opening (b) will usually be connected to the gas outlet (exhaust) of the fuel cell and the regenerating gas will exit the device through opening (a) after it has regenerated sorbent (c) by desorbing carbon dioxide therefrom.

A fuel cell system according to the present invention comprises a fuel cell (A) and in particular, an alkaline fuel cell, and at least one device (B) for purifying carbon dioxide-contaminated gas according to the present invention. The system will usually further comprise a device (C) for supplying gas to be scrubbed to (B). Device (C) may, for example, take the form of a gas (e.g. air) compressor or gas blower.

In a preferred embodiment, the system of the present invention comprises at least two (and usually exactly two) devices (B), device (B1) and device (B2). For example, a device (B1) may be connected to a gas inlet of (A) and a device (B2) may be connected to a gas outlet of (A). This makes it possible to operate the system continuously, i.e., by scrubbing gas in the first device while regenerating sorbent in the second device (preferably with exhaust gas from the fuel cell) and thereafter scrubbing gas in the second device while regenerating sorbent in the first device, and so on.

In other words, the system preferably is designed such that exhaust gas coming from a gas outlet of fuel cell (A) can be used as either as regenerating gas for carbon dioxide-loaded sorbent (c) of (B2) while at the same time gas is scrubbed by (B1) or as regenerating gas for carbon dioxide-loaded sorbent (c) of (B1) while gas is scrubbed by (B2). Of course, it is also possible for the system of the present invention to comprise more than two devices (B). For example, if a third device (B3) is present, the system can be operated continuously with two devices (B) while the third device is taken off-line, for example to replace sorbent (c) (either by the same fresh sorbent or by a different type of sorbent) or to replace or clean parts of a gas preparation unit (e.g., empty a tank (f) and/or a tank (g)).

If devices (B1) and (B2) are present in the system of the present invention, at least one valve (D) will usually be arranged between the fuel cell (A) and the devices (B1) and (B2) for connecting the gas inlet and the gas outlet of (A) with opening (b) of (B1) and opening (b) of (B2) (opening (a) being the opening through which gas to be scrubbed enters a device). Further, one or more valves (E) may be arranged between (C) and (B1) and (B2) such that gas provided by (C) can be directed to either (a) of (B1) or (a) of (B2).

In the following several embodiments of the fuel cell system of the present invention will be explained with reference to the accompanying drawings. In these drawings, like numerals denote like components.

FIG. 1 shows a fuel cell system which comprises an air blower 1, a first valve 2 of the 4/2 type, a first gas scrubbing device 3 comprising a first gas preparation unit 4 having a tank 5 associated with it, sorbent 6 arranged in layers, and a second gas preparation unit 7 having a tank 8 associated with it, a second valve 9 of the 4/2 type, a fuel cell 10, a second gas scrubbing device 12 comprising a second gas preparation unit 13 having a tank 14 associated with it, sorbent 15 arranged in layers, and a first gas preparation unit 16 having a tank 17 associated with it.

FIG. 1(a) shows the mode in which device 3 is used for scrubbing gas for the fuel cell 10 while sorbent 15 in device 12 is regenerated by gas that has exited the fuel cell 10 and FIG. 1(b) shows the mode in which device 12 is used for scrubbing gas for the fuel cell 10 while sorbent 6 in device 3 is regenerated. In particular, with reference to FIG. 1(a), gas provided by the air blower 1 is directed by the valve 2 to the (in this case) gas inlet of the first device 3. In the device 3 the gas passes through the first gas preparation unit 4 where solid and/or liquid contaminants are removed from the gas (and collected in tank 5) and where its temperature and/or humidity are adjusted to suitable values for its subsequent contact with (fresh or regenerated) sorbent 6 (temperature and humidity of the gas may be measured by sensors, whose signals may be processed by a computer which in turn activates equipment for changing the temperature of element (ii) and/or the moisture content of element (iii) of gas preparation unit 4, if necessary). Thereafter the gas passes through the second gas preparation unit 7 (in which its temperature and/or humidity may be adjusted) and then exits device 3 through the outlet thereof, whereafter it is directed by valve 9 to the gas inlet of the fuel cell 10. In fuel cell 10 the oxygen in the gas is used to generate energy by oxidizing hydrogen. The oxygen-depleted gas exits the fuel cell 10 and is directed by valve 9 to (in this case) the gas inlet of scrubbing device 12 in which it is used to regenerate carbon dioxide-loaded sorbent 15 present therein (from a previous gas scrubbing operation) by desorption of carbon dioxide therefrom. In particular, after entering device 12, the gas passes through the second gas preparation unit 13 (corresponding to the second gas preparation unit 7 of device 3) where solid and/or liquid contaminants are removed from the gas (and collected in tank 14) and where its temperature and/or humidity are adjusted to suitable values for its subsequent contact with carbon dioxide-loaded sorbent 15. Thereafter the carbon dioxide enriched gas passes through the first gas preparation unit 16 and then exits device 12 through (in this case) the gas outlet thereof. The gas may thereafter be released into the atmosphere or used for other purposes (e.g., for heating).

With reference to FIG. 1(b), gas provided by the air blower 1 is directed by the valve 2 to (in this case) the gas inlet of the second device 12. In the device 12 the gas passes through the first gas preparation unit 16 where solid and/or liquid contaminants are removed from the gas (and collected in tank 17) and where its temperature and/or humidity are adjusted to suitable values for its subsequent contact with fresh or regenerated sorbent 15. Thereafter the gas passes through the second gas preparation unit 13 (in which its temperature and/or humidity may be adjusted) and then exits device 12 through the (in this case) gas outlet thereof, whereafter it is directed by valve 9 to the gas inlet of the fuel cell 10. In fuel cell 10 the oxygen in the gas is used to generate energy by oxidizing hydrogen. The oxygen-depleted gas exits the fuel cell 10 and is directed by valve 9 to (in this case) the gas inlet of scrubbing device 3 in which it is used to regenerate carbon dioxide-loaded sorbent 6 present therein by desorption of carbon dioxide from a previous gas scrubbing operation (e.g., the operation described with reference to FIG. 1(a)). In particular, after entering device 3, the gas passes through the second gas preparation unit 7 (corresponding to the second gas preparation unit 13 of device 12) where solid and/or liquid contaminants are removed from the gas (and collected in tank 8) and where its temperature and/or humidity are adjusted to suitable values for its subsequent contact with carbon dioxide-loaded sorbent 6. Thereafter the carbon dioxide enriched gas passes through the first gas preparation unit 4 and then exits device 3 through (in this case) the gas outlet thereof. This gas may then be released into the atmosphere or used for other purposes (e.g., for heating).

FIG. 2 schematically shows a fuel cell system of the present invention which is similar to the fuel cell system shown in FIG. 1. However, in this case the second valve 9 is replaced by two valves 18 and 19 of the 3/2 type. The fuel cell system schematically shown in FIG. 3 also is similar to the system of FIG. 1. However, in this case the second valve 9 is replaced by two leaf-type valves 21 and 22 of the 2/2 type. Further, gas to be scrubbed and regenerating gas are directed to enter the devices 3 and 12 at the same opening, wherefore each of the devices is provided with valves 20 and 23 for releasing carbon-dioxide enriched gas (e.g., into the environment).

Figure 4:
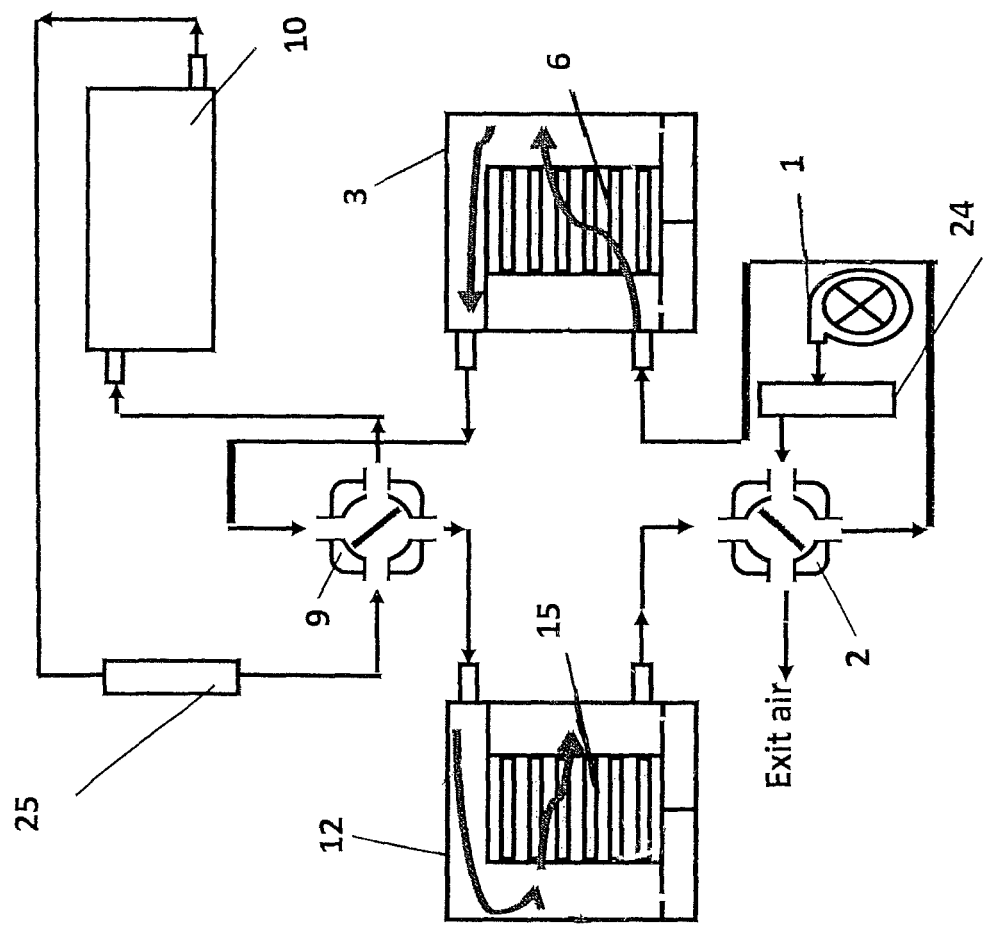
FIG. 4 schematically shows a fourth embodiment of a fuel cell system according to the present invention.

FIG. 4 shows an embodiment of the fuel cell system of the present invention which corresponds to the system shown in FIG. 1 except that the gas scrubbing devices 3 and 12 do not comprise any gas preparation units. Instead, a gas preparation unit 24 is arranged between the blower 1 and the valve 2 (for use with both devices 3 and 12) and another gas preparation unit 25 is arranged between the exhaust of the fuel cell 10 and the valve 9 (also for use by both devices 3 and 12).

Figure 3:
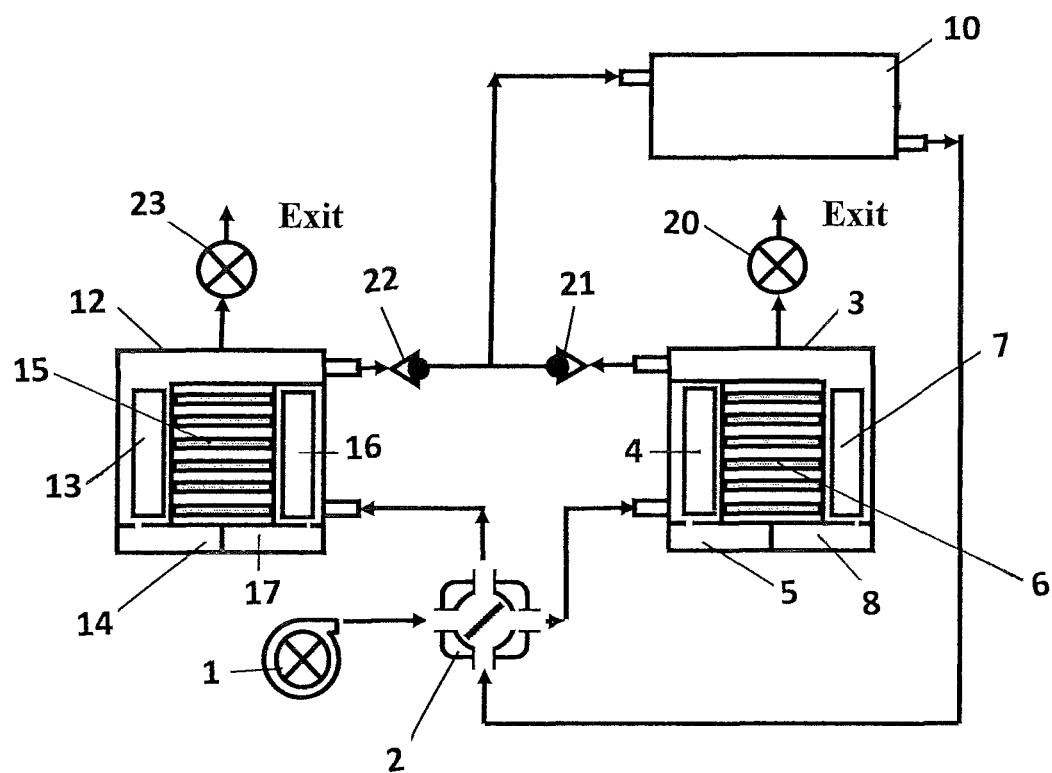
FIG. 3 schematically shows a third embodiment of a fuel cell system according to the present invention.
Figure 5:
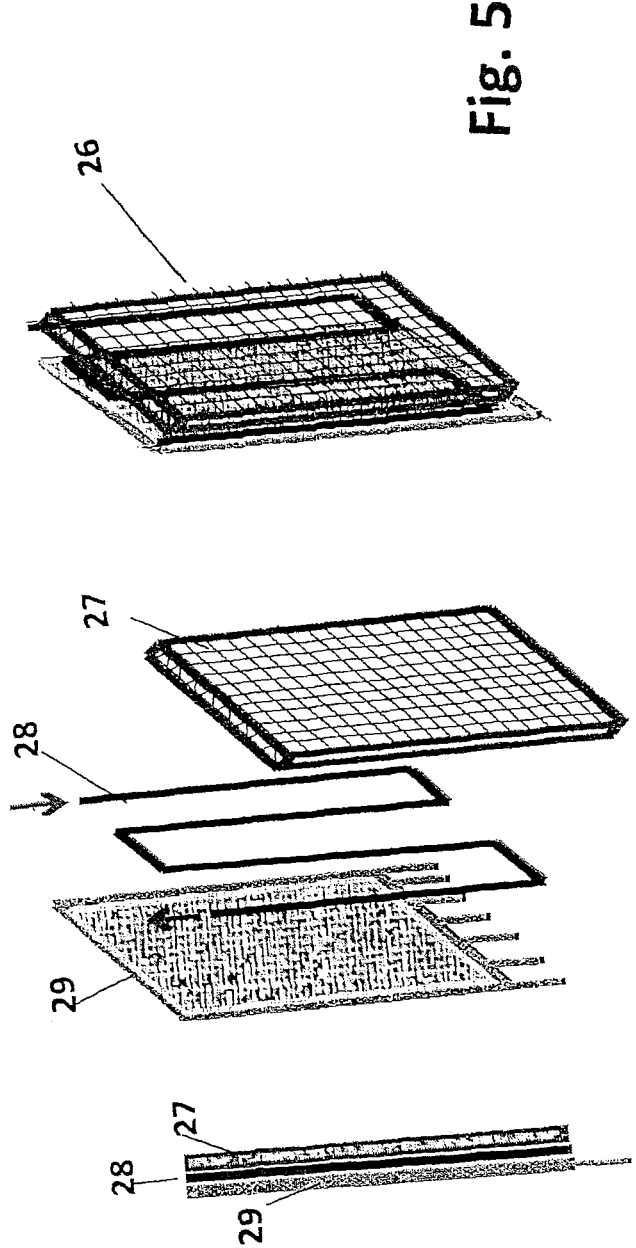
FIG. 5 schematically shows a gas preparation unit for use in a gas purification device according to the present invention.

FIG. 5 schematically shows a gas preparation unit that is suitable for use in the gas scrubbing devices 3 and 12 shown in FIGS. 1 to 3 (and as a stand-alone gas preparation unit shown in FIG. 4). As can be seen, the gas preparation unit 26 comprises three components or units, i.e., a unit 27 of porous hydrophobic material for removing solid and/or liquid contaminants from the gas, a unit 28 for heating or cooling the gas (in the form of a tubular heat exchanger) and a unit 29 of a cloth-like fibrous hydrophilic material which serves as a wick for humidifying or dehumidifying the gas.

Figure 6:
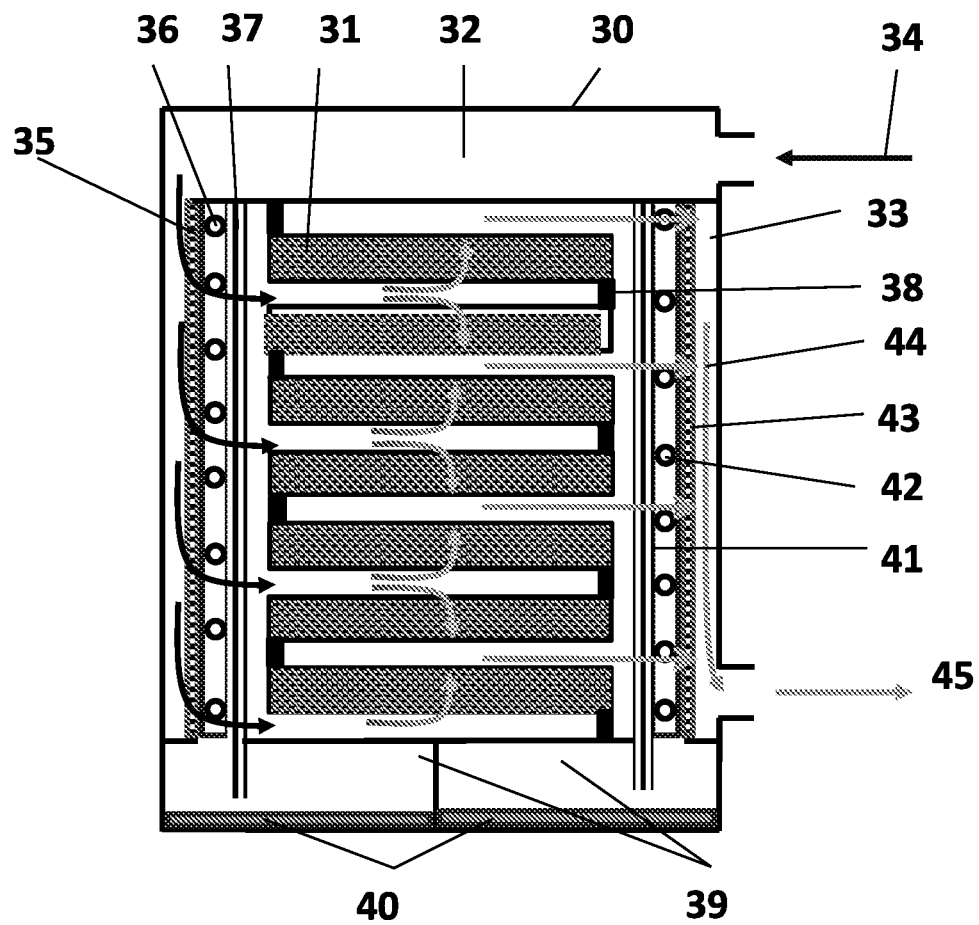
FIG. 6 schematically shows an embodiment of a scrubbing device according to the present invention.

FIG. 6 illustrates a scrubbing device, i.e., one of the two scrubbing devices that are usually used in the fuel cell system of the present invention. The scrubbing device comprises a housing 30 containing trays or cartridges 31 with a sorbent material. The device comprises two collecting chambers 32 and 33 connected to gas inlet 34 and gas outlet 45 for the air flow (whose direction is reversed when transitioning the device into scrubbing mode). Each collecting chamber comprises an air preparation system consisting of a filter 35, a heater 36 and a hydrophilic plate 37. The trays or cartridges 31 are attached to a frame that forms a separation zone 38 between the trays for the regenerating air stream. Two separate chambers 39 collect liquid 40 separated from the regenerating gas stream.

FIG. 6 illustrates schematically a scrubbing device in a state of removing carbon dioxide from the sorbent by heated air from the fuel cell. The device operates as follows. Exhaust air from the fuel cell at elevated temperature (e.g., 40 to 70° C.) with a low content of carbon dioxide (e.g., about 4 ppm) that possibly carries aqueous KOH in the form of droplets or an aerosol enters the scrubbing device through gas inlet 34. After passing through the chamber 32, the air flows in the area of the gas preparation unit where it is cleaned and filtered by passing through hydrophobized porous plate 35 made of, for example, PTFE or metal sponge. After purification the air flow passes through the preheater 36 and the tissue type wick 37 in which the air is humidified or dehumidified as appropriate. Prepared, heated and humidified or dehumidified air flows into the space between the cartridges or trays of sorbent and also passes through them, whereby the air is loaded with carbon dioxide desorbed from the sorbent (desorption) and enters the chamber 33 via a fuse 41, a heater 42, and a hydrophobic plate 43. The heater 42, in this case, can be activated in accordance with the common algorithm for controlling the operation of the ECG system. After having passed chamber 33, the airflow 44 is sent to a waste heat-exchanger or simply exhausted via outlet 45. Fluid 40 removed from the airflow accumulates in one of the chambers 39.

To sum up, the present invention provides the following items:

1. A device for scrubbing carbon dioxide-contaminated gas for use in a fuel cell, wherein the device comprises at least one first opening (a) for allowing gas to enter or exit the device, at least one second opening (b) for allowing gas to exit or enter the device, one of (a) and (b) being connected to a gas inlet or a gas outlet of a fuel cell, and at least one sorbent (c) that is capable of removing carbon dioxide from the gas and is arranged in the form of layers which the gas contacts when flowing from (a) to (b) or vice versa.
2. The device of item 1, wherein the fuel cell is an alkaline fuel cell.
3. A device for scrubbing carbon dioxide-contaminated gas for use in a fuel cell, wherein the device comprises at least one first opening (a) for allowing gas to enter or exit the device, at least one second opening (b) for allowing gas to exit or enter the device, at least one sorbent (c) that is capable of removing carbon dioxide from the gas and is arranged in the form of layers which the gas contacts when flowing from (a) to (b) or vice versa, and at least one of a first gas preparation unit (d) through which gas whose carbon dioxide content is to be reduced passes before contacting (c), the first gas preparation unit comprising one or more of an element (i) for removing solid and/or liquid contaminants from the gas, an element (ii) for heating or cooling the gas, and an element (iii) for humidifying or dehumidifying the gas, and a second gas preparation unit (e) through which gas for regenerating sorbent (c) passes before contacting carbon dioxide-loaded sorbent, which second gas preparation unit comprises one or more of an element (i) for removing solid and/or liquid contaminants from the regenerating gas, an element (ii) for heating or cooling the regenerating gas, and an element (iii) for humidifying or dehumidifying the regenerating gas.
4. The device of any one of items 1 to 3, wherein the device comprises at least three layers of (c).
5. The device of any one of items 1 to 4, wherein at least some of the layers of (c) are arranged substantially in parallel to each other.
6. The device of any one of items 1 to 5, wherein an average distance between the layers of (c) is from 1 mm to 10 mm.
7. The device of any one of items 1 to 6, wherein at least some of the layers of (c) are arranged substantially in parallel to a direction of flow of gas from (a) to (b).
8. The device of any one of items 1 to 7, wherein (c) is regeneratable.
9. The device of any one of items 1 to 8, wherein (c) comprises at least one amine.
10. The device of item 9, wherein the at least one amine is at least one of immobilized on silica particles, impregnated on natural fibers, impregnated on a basic ion exchange resin.
11. The device of any one of items 1 to 10, wherein (c) comprises at least one hydrated oxide of a transition metal.
12. The device of any one of items 1 to 11, wherein (c) comprises a hydrotalcite.
13. The device of any one of items 1 to 12, wherein (c) comprises particles having an average largest dimension of not more than 0.5 mm.
14. The device of any one of items 1 to 13, wherein (c) comprises a porous material having an average pore size of not more than 0.5 mm.
15. The device of any one of items 3 to 14, wherein the device comprises both (d) and (e).
16. The device of any one of items 3 to 15, wherein at least one of (d) and (e) is arranged substantially perpendicularly to a direction of flow of gas from (a) to (b).
17. The device of any one of items 3 to 16, wherein the device further comprises a first receptacle (f) for receiving solid and/or liquid contaminants in gas to be scrubbed removed by (d) and/or a second receptacle (g) for receiving solid and/or liquid contaminants in regenerating gas removed by (e).
18. The device of any one of items 3 to 17, wherein element (i) of (d) and/or element (i) of (e) comprises a hydrophobic porous material that is capable of removing solid and/or liquid contaminants from gas passing through it.
19. The device of item 18, wherein the hydrophobic porous material is present in the form of a sheet or layer.
20. The device of any one of items 3 to 19, wherein element (ii) of (d) and/or element (ii) of (e) comprises an electric heater.
21. The device of any one of items 3 to 20, wherein element (ii) of (d) and/or element (ii) of (e) comprises a heat exchanger.
22. The device of any one of items 3 to 21, wherein element (iii) of (d) and/or element (iii) of (e) comprises a hydrophilic porous material which is capable of humidifying or dehumidifying gas passing through it.
23. The device of item 22, wherein the hydrophilic porous material is present in a form of a fibrous sheet or layer.
24. The device of any one of items 3 to 23, wherein (d) and (e) are present and both comprise at least units (i) and (iii).
25. The device of any one of items 3 to 24, wherein (d) and (e) are present and both comprise units (i), (ii), and (iii).
26. The device of any one of items 24 and 25, wherein units (i) and (iii) or units (i) to (iii) are arranged such that gas will contact element (i) first.

27. The device of any one of items 3 to 26, wherein one of (a) and (b) is connected to a gas inlet or a gas outlet of a fuel cell.
28. The device of item 27, wherein the fuel cell is an alkaline fuel cell.
29. A fuel cell system, wherein the system comprises a fuel cell (A) and at least one device (B) according to any one of items 1 to 28.
30. The fuel cell system of item 29, wherein (A) is an alkaline fuel cell.
31. The fuel cell system of any one of items 29 and 30, wherein the system further comprises a device (C) for supplying gas to be scrubbed to (B).
32. The fuel cell system of any one of items 29 to 31, wherein the system comprises at least two devices (B).
33. The fuel cell system of item 32, wherein a first device (B1) is connected to a gas inlet of (A) and a second device (B2) is connected to a gas outlet of (A).
34. The fuel cell system of any one of items 32 and 33, wherein the system is configured such that gas coming from a gas outlet of (A) can be used as (1) regenerating gas for carbon dioxide-loaded sorbent (c) of (B2) while gas provided by (C) is scrubbed by (B1) or as (2) regenerating gas for carbon dioxide-loaded sorbent (c) of (B1) while gas provided by (C) is scrubbed by (B2).
35. The fuel cell system of item 34, wherein at least one valve (D) is arranged between (A) and (B1) and (B2) and is capable of connecting the gas inlet and the gas outlet of (A) with (b) of (B1) and (b) of (B2).
36. The fuel cell system of any one of items 34 to 35, wherein at least one valve (E) is arranged between (C) and (B1) and (B2) such that gas provided by (C) can be directed to either (a) of (B1) or (a) of (B2).
37. A method of scrubbing carbon dioxide-contaminated gas for use in a fuel cell, wherein the method comprises passing the gas through the device according to any one of items 1 to 28.
38. The method of item 37, wherein the gas comprises air.
39. The method of any one of items 37 and 38, wherein the method further comprises regenerating carbon dioxide-loaded sorbent (c).
40. The method of item 39, wherein carbon dioxide-loaded sorbent (c) is regenerated by using gas that has passed through the fuel cell.
41. The method of item 40, wherein the method comprises using at least two devices according to any one of items 1 to 27, a first device comprising fresh or regenerated agent (c) for removing carbon dioxide from the gas for use in the fuel cell to afford a first device comprising carbon dioxide-loaded sorbent (c), and a second device comprising carbon dioxide-loaded sorbent (c) from a previous scrubbing operation, the carbon dioxide-loaded sorbent (c) being regenerated by using scrubbed gas from the first device that has already passed through the fuel cell to afford a second device comprising regenerated sorbent (c).
42. The method of item 41, wherein the method further comprises using the second device comprising regenerated sorbent (c) for removing carbon dioxide from the gas for use in the fuel cell and regenerating carbon dioxide-loaded sorbent (c) in the first device with scrubbed gas from the second device that has already passed through the fuel cell to afford a first device comprising regenerated agent (c).
43. The method of item 42, wherein at least two scrubbing-regeneration cycles are carried out.
44. The method of any one of items 37 to 43, wherein gas that has been used for regenerating carbon dioxide-loaded sorbent (c) is used for heating purposes.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A fuel cell system which comprises a fuel cell (A) and at least one device (B) configured to scrub carbon dioxide-contaminated gas at a cathode of the fuel cell, wherein the device (B) comprises at least one first opening (a) for allowing gas to enter or exit the device, at least one second opening (b) for allowing gas to exit or enter the device, one of (a) and (b) being connected to a gas inlet or a gas outlet of the cathode of the fuel cell, and at least one sorbent (c) configured to remove carbon dioxide from the gas and is arranged in the form of layers which the gas contacts when flowing from (a) to (b) or vice versa.

2. The fuel cell system of claim 1, wherein the fuel cell (A) is an alkaline fuel cell.

3. The fuel cell system of claim 1, wherein the device (B) for scrubbing carbon dioxide-contaminated gas further comprises at least one of a first gas preparation unit (d) through which gas whose carbon dioxide content is to be reduced passes before contacting (c), the first gas preparation unit comprising one or more of an element (i) for removing solid and/or liquid contaminants from the gas, an element (ii) for heating or cooling the gas, and an element (iii) for humidifying or dehumidifying the gas, and a second gas preparation unit (e) through which gas for regenerating sorbent (c) passes before contacting carbon dioxide-loaded sorbent, which second gas preparation unit comprises one or more of an element (i) for removing solid and/or liquid contaminants from the regenerating gas, an element (ii) for heating or cooling the regenerating gas, and an element (iii) for humidifying or dehumidifying the regenerating gas.

4. The fuel cell system of claim 1, wherein the device (B) for scrubbing carbon dioxide-contaminated gas comprises at least three layers of the at least one sorbent (c).

5. The fuel cell system of claim 1, wherein at least some of the layers of the at least one sorbent (c) are arranged substantially in parallel to each other.

6. The fuel cell system of claim 5, wherein an average distance between the layers of the at least one sorbent (c) is from 1 mm to 10 mm.

7. The fuel cell system of claim 4, wherein at least some of the layers of the at least one sorbent (c) are arranged substantially in parallel to a direction of flow of gas from the first opening (a) to the second opening (b) of the device (B) for scrubbing carbon dioxide-contaminated gas.

8. The fuel cell system of claim 1, wherein the at least one sorbent (c) comprises at least one amine.

9. The fuel cell system of claim 1, wherein the at least one sorbent (c) comprises at least one hydrated oxide of a transition metal.

10. The fuel cell system of claim 1, wherein the at least one sorbent (c) comprises particles having an average largest dimension of not more than 0.5 mm.

11. The fuel cell system of claim 1, wherein the at least one sorbent (c) comprises a porous material having an average pore size of not more than 0.5 mm.

12. The fuel cell system of claim 3, wherein the device comprises both the first gas preparation unit for gas to be scrubbed (d) and the second gas preparation unit for regeneration gas (e).

13. The fuel cell system of claim 12, wherein the device further comprises a first receptacle (f) for receiving solid and/or liquid contaminants in gas to be scrubbed removed by the first gas preparation unit for gas to be scrubbed (d) and/or a second receptacle (g) for receiving solid and/or liquid contaminants in regenerating gas removed by the second gas preparation unit for regeneration gas (e).

14. The fuel cell system of claim 1, wherein the system further comprises a device (C) for supplying gas to be scrubbed to (B) for scrubbing carbon dioxide-contaminated gas.

15. The fuel cell system of claim 1, wherein the system comprises at least two devices (B) for scrubbing carbon dioxide-contaminated gas.

16. The fuel cell system of claim 15, wherein a first device (B1) for scrubbing carbon dioxide-contaminated gas is connected to a gas inlet of the the cathode of the fuel cell (A) and a second device (B2) for scrubbing carbon dioxide-contaminated gas is connected to a gas outlet of the cathode of the fuel cell (A).

17. The fuel cell system of claim 3, wherein at least one of the first and second gas preparation units comprises an element (i) for removing solid and/or liquid contaminants from the gas to be scrubbed/the regenerating gas.

18. The fuel cell system of claim 3, wherein at least one of the first and second gas preparation units comprises an element (ii) for heating or cooling the gas to be scrubbed/the regenerating gas.

19. The fuel cell system of claim 3, wherein at least one of the first and second gas preparation units comprises an element (iii) for humidifying or dehumidifying the gas to be scrubbed/the regenerating gas.

20. The fuel cell system of claim 3, wherein each of the first and second gas preparation units comprises at least two of element (i) for removing solid and/or liquid contaminants from the gas to be scrubbed/the regenerating gas, element (ii) for heating or cooling the gas to be scrubbed/the regenerating gas, and element (iii) for humidifying or dehumidifying the gas to be scrubbed/the regenerating gas.

* * * * *